United States Patent
Matsuo

(10) Patent No.: US 11,641,034 B2
(45) Date of Patent: May 2, 2023

(54) FUEL CELL SYSTEM

(71) Applicant: TOYOTA JIDOSHA KABUSHIKI KAISHA, Toyota (JP)

(72) Inventor: Junichi Matsuo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 17/319,268

(22) Filed: May 13, 2021

(65) Prior Publication Data

US 2021/0367282 A1 Nov. 25, 2021

(30) Foreign Application Priority Data

May 22, 2020 (JP) .............................. JP2020-089687

(51) Int. Cl.
*H01M 10/44* (2006.01)
*H01M 8/04746* (2016.01)

(52) U.S. Cl.
CPC ..... *H01M 10/443* (2013.01); *H01M 8/04753* (2013.01); *H01M 2220/20* (2013.01); *H01M 2250/20* (2013.01)

(58) Field of Classification Search
CPC ........... H01M 10/443; H01M 8/04753; H01M 2220/20; H01M 2250/20
See application file for complete search history.

(56) References Cited

U.S. PATENT DOCUMENTS

| | | | | |
|---|---|---|---|---|
| 2009/0162710 A1* | 6/2009 | Kajiwara | .......... | H01M 8/04589 429/415 |
| 2016/0380282 A1 | 12/2016 | Maruo et al. | | |

FOREIGN PATENT DOCUMENTS

| | | | | |
|---|---|---|---|---|
| JP | 2006079864 A | | 3/2006 | |
| JP | 2006179472 A | | 7/2006 | |
| JP | 2017010904 A | | 1/2017 | |
| JP | 2018113126 A | * | 7/2018 | |
| JP | 2018137220 A | * | 8/2018 | .............. B60L 1/003 |

OTHER PUBLICATIONS

English machine translation of Noguchi (JP 2018113126 A) (Year: 2018).*
English machine translation of Aso et a. (JP 2018137220 A) (Year: 2018).*

* cited by examiner

*Primary Examiner* — Brian R Ohara
*Assistant Examiner* — Aaron J Salter
(74) *Attorney, Agent, or Firm* — Dickinson Wright, PLLC

(57) ABSTRACT

A fuel cell system installed in a vehicle, the system comprising: a fuel cell, a secondary cell, a system temperature acquirer for acquiring a temperature of an inside of the fuel cell system, and a controller, wherein, when the system temperature is a predetermined first temperature or less, the controller charges the secondary cell until a state-of-charge value of the secondary cell reaches a predetermined first threshold value, and the controller carries out a first pattern purge on the fuel cell, and wherein, when the system temperature exceeds the predetermined first temperature, the controller charges the secondary cell until the state-of-charge value of the secondary cell reaches a predetermined second threshold value that is larger than the predetermined first threshold value, and the controller carries out a second pattern purge having a shorter purge time than the first pattern purge on the fuel cell.

2 Claims, 2 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane"). Accordingly, the membrane electrode assembly may be referred to as "membrane electrode gas diffusion layer assembly" (MEGA).

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell system which is installed and used in a fuel cell vehicle (hereinafter may be simply referred to as "vehicle").

For example, Patent Literature 1 discloses a fuel cell system in which, when the fuel cell is stopped, the secondary cell is charged by the power of the fuel cell in preparation of the next start-up.

Patent Literature 2 discloses a fuel cell system which determines, when the fuel cell is stopped, the necessity for purging the fuel cell and then purges the fuel cell if necessary.

Patent Literature 3 discloses a fuel cell system which changes the fuel cell purging time depending on the outside temperature.

Patent Literature 1: Japanese Patent Application Laid-Open (JP-A) No. 2006-179472

Patent Literature 2: JP-A No. 2006-079864

Patent Literature 3: JP-A No. 2017-010904

When the outside temperature is a temperature lower than normal temperature (low temperature), the power required by the vehicle tends to be larger. Accordingly, in the case of charging the secondary cell during the process of purging the fuel cell, there is the following problem: at lower temperature, the charging time gets longer than normal temperature.

In the case where, when the outside temperature is normal temperature, the fuel cell is stopped and a parking purge is carried out on the stopped fuel cell, the parking purge may fail due to insufficient power of the secondary cell, since the parking purge consumes larger power of the secondary cell than the process of purging the fuel cell at low temperature.

SUMMARY

The disclosed embodiments were achieved in light of the above circumstances. An object of the disclosed embodiments is to provide a fuel cell system configured to reduce a secondary cell charging time.

In a first embodiment, there is provided a fuel cell system installed in a vehicle, the system comprising:
a fuel cell,
a secondary cell,
a system temperature acquirer for acquiring a temperature of an inside of the fuel cell system, and
a controller,
wherein, when the system temperature is a predetermined first temperature or less, the controller charges the secondary cell until a state-of-charge value of the secondary cell reaches a predetermined first threshold value, and the controller carries out a first pattern purge on the fuel cell, and
wherein, when the system temperature exceeds the predetermined first temperature, the controller charges the secondary cell until the state-of-charge value of the secondary cell reaches a predetermined second threshold value that is larger than the predetermined first threshold value, and the controller carries out a second pattern purge having a shorter purge time than the first pattern purge on the fuel cell.

The fuel cell system may further comprise a secondary cell temperature acquirer for acquiring a temperature of the secondary cell, and when the system temperature exceeds the first temperature, when the secondary cell temperature is a predetermined second temperature or less, and also when the state-of-charge value of the secondary cell is less than the second threshold value, the controller may carry out the first pattern purge on the fuel cell.

According to the fuel cell system of the disclosed embodiments, the secondary cell charging time is reduced.

BRIEF DESCRIPTION OF THE DRAWINGS

In the accompanying drawings.

DETAILED DESCRIPTION

Figure 1:
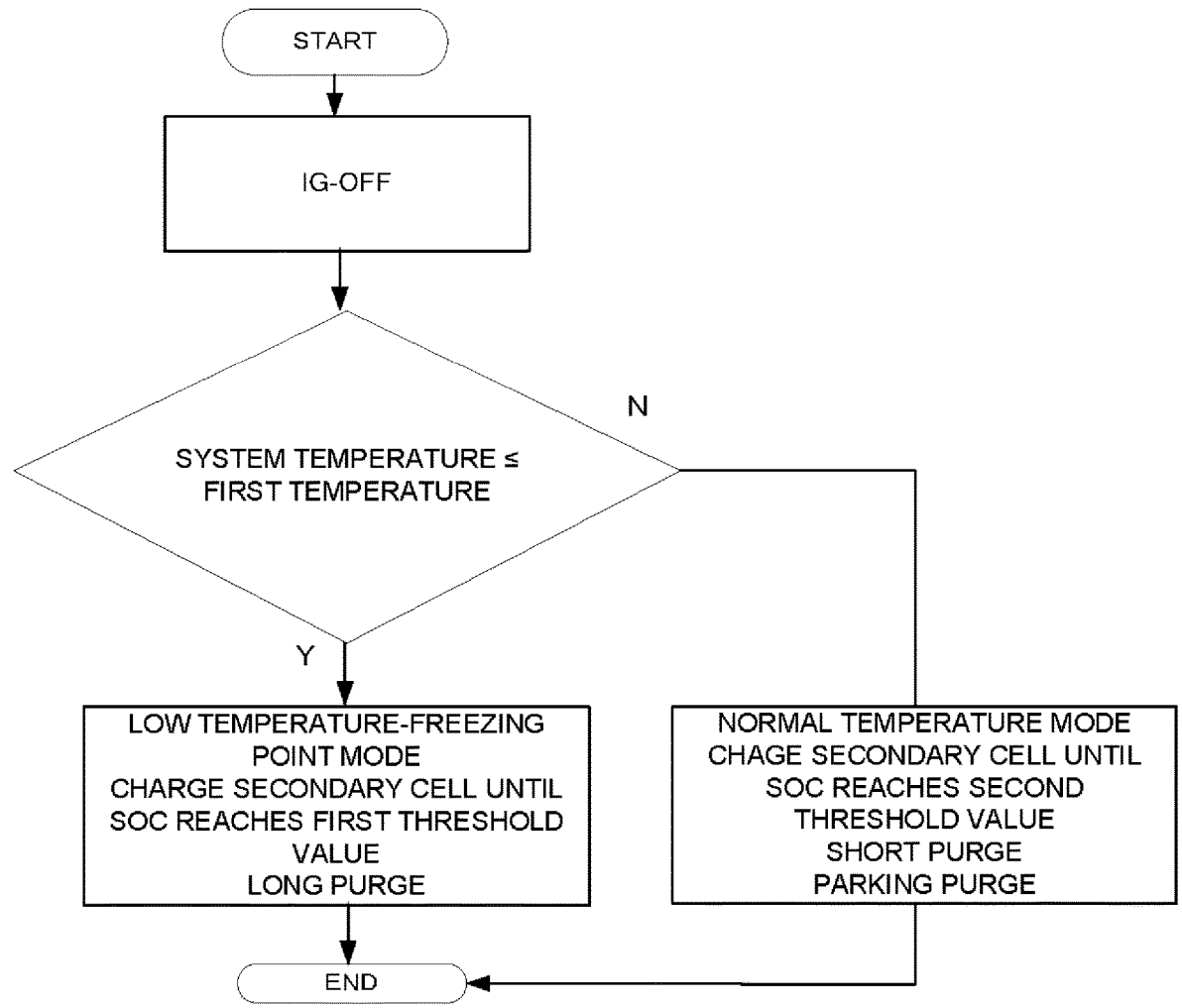
FIG. 1 is the flow chart of an example of the method for controlling the fuel cell system of the disclosed embodiments.

The fuel cell system of the disclosed embodiments is a fuel cell system installed in a vehicle, the system comprising:
a fuel cell,
a secondary cell,
a system temperature acquirer for acquiring a temperature of an inside of the fuel cell system, and
a controller,
wherein, when the system temperature is a predetermined first temperature or less, the controller charges the secondary cell until a state-of-charge value of the secondary cell reaches a predetermined first threshold value, and the controller carries out a first pattern purge on the fuel cell, and wherein, when the system temperature exceeds the predetermined first temperature, the controller charges the secondary cell until the state-of-charge value of the secondary cell reaches a predetermined second threshold value that is larger than the predetermined first threshold value, and the controller carries out a second pattern purge having a shorter purge time than the first pattern purge on the fuel cell.

In the FC system, the power discharged from the secondary cell is used for the process of purging the fuel cell during the stoppage of the power generation of the fuel cell, for a parking purge (PPG) of the fuel cell, for the process of starting up the fuel cell at freezing point, etc.

When the state-of-charge (SOC) value of the secondary cell decreases, the secondary cell may fail to start up. Accordingly, when the SOC value of the secondary cell decreases, the process of charging the secondary cell until it reaches the predetermined SOC value even if the ignition switch of the vehicle is turned off (IG-OFF) and then stopping the secondary cell, is performed.

However, when a secondary cell such as a lithium (Li) ion secondary cell is used as the secondary cell, there is the following problem: since the secondary cell charging amount may be limited to protect the secondary cell in continuous charging, the secondary cell charging time after IG-OFF is increased.

As the process of starting up the fuel cell after stoppage of the power generation of the fuel cell, examples include the following two patterns.

(1) Low Temperature-Freezing Point Mode (Winter Mode)

While charging the secondary cell as needed or after charging the secondary cell, the fuel cell is purged for about several minutes (a long purge). Without carrying out a subsequent parking purge on the fuel cell, the process of starting up the fuel cell (e.g., warming up) is performed. The low temperature means a temperature lower than normal temperature.

(2) Normal Temperature Mode (Summer Mode)

While charging the secondary cell as needed or after charging the secondary cell, the fuel cell is purged for about ten to a few tens of seconds (e.g., 10 to 20 seconds) (a short purge). Then, during the stoppage of the vehicle, a parking purge is carried out on the fuel cell for about a few minutes at low temperature. Then, the process of starting up the fuel cell (e.g., warming up) is performed.

The normal temperature mode is advantageous in that the purge time is shorter than the low temperature-freezing point mode. However, since a parking purge is carried out only by the power of the secondary cell (without the power generation of the fuel cell), it requires more energy of the secondary cell compared to a long purge which can be carried out during the power generation of the fuel cell. In the normal temperature mode, accordingly, the secondary cell charging process during IG-OFF is also needed to be performed to reach a large SOC value compared to the low temperature-freezing point mode. If it is tried to charge the secondary cell until it reaches a SOC value that enables a parking purge, the secondary cell charging time is increased. When the temperature of the secondary cell (such as a Li ion secondary cell) is low, a charge limit is needed for the purpose of protection against Li ion precipitation, etc. Accordingly, the secondary cell charging time is further increased.

It was found that an example of the difference in charging time due to the difference in secondary cell temperature, is as follows: in the case where a predetermined sample secondary cell with a SOC of 20% is charged until it reaches the target charge value of the normal temperature mode (in this case, a SOC of 50%), the charging time is 15 minutes when the temperature of the sample secondary cell is −5° C., and the charging time is 5 minutes when the temperature of the sample secondary cell is 10° C. Accordingly, the charging time tends to increase as the secondary cell temperature decreases.

According to the disclosed embodiments, the secondary cell charging time is reduced by stopping the power generation of the working fuel cell, calculating how much energy is required of the secondary cell until the fuel cell starts up, and then varying the target SOC value of the secondary cell.

If the charging of the secondary cell takes a long time, the secondary cell charging time during the stoppage of the power generation of the fuel cell, is reduced by switching the fuel cell purging method to a method by which the discharge energy of the secondary cell is reduced.

According to the disclosed embodiments, the secondary cell can be charged for a short time by changing the secondary cell charging amount depending on the system temperature considering the outside temperature, etc. Also, it is possible to prevent a failure of a parking purge due to insufficient power of the secondary cell.

According to the disclosed embodiments, even when a measure against freezing point is unnecessary, if the secondary cell charging time is likely to be long, the need for charging in preparation for a parking purge by the power of the secondary cell, is eliminated by purging the fuel cell for a long time.

The fuel cell system of the disclosed embodiments comprises at least the fuel cell, the secondary cell, the system temperature acquirer for acquiring the temperature of the inside of the fuel cell system, and the controller. The fuel cell system of the disclosed embodiments may further comprise a secondary cell temperature acquirer for acquiring the temperature of the secondary cell, etc.

In general, the fuel cell system of the disclosed embodiments is installed and used in a fuel cell vehicle that uses a motor as a driving source.

Also, the fuel cell system of the disclosed embodiments may be installed and used in a vehicle that can be, even if the fuel cell cannot generate power at the start-up of the vehicle, run by the power of the secondary cell.

The motor is not particularly limited. It may be a conventionally-known drive motor.

The fuel cell may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a refrigerant flow path for keeping the fuel cell temperature at a constant level.

The separators may have supply and discharge holes for delivering the reaction gas and the refrigerant in the unit cell stacking direction.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel cell system may include a reaction gas supplier for supplying reaction gas to the electrodes of the fuel cell.

The reaction gas supplier supplies reaction gas to the fuel cell stack.

The reaction gas encompasses fuel gas and oxidant gas.

As the reaction gas supplier, examples include, but are not limited to, a fuel gas supplier and an oxidant gas supplier. The fuel cell system may include any one of the suppliers, or it may include both of them.

The fuel cell system may include the fuel gas supplier for supplying fuel gas to the fuel electrode of the fuel cell.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include a fuel gas supply flow path.

The fuel gas supply flow path connects the fuel cell to the fuel gas supplier and enables the supply of fuel gas from the fuel gas supplier to the fuel electrode of the fuel cell.

The fuel cell system may include a circulation flow path.

The circulation flow path enables that fuel off-gas discharged from the fuel electrode of the fuel cell is recovered and returned as circulation gas to the fuel electrode of the fuel cell.

The fuel off-gas contains the following, for example: fuel gas which passed through the fuel electrode while remaining unreacted, moisture which is water generated at the oxidant electrode and delivered to the fuel electrode, and oxidant gas which may be supplied to the fuel electrode during a purge.

As needed, the circulation flow path of the fuel cell system may be provided with an ejector, a circulation pump for controlling the flow rate of the circulation gas (such as a hydrogen pump), etc.

The circulation pump may be electrically connected to the controller, and the flow rate of the circulation gas may be controlled by controlling the turning on/off, rotational frequency, etc., of the circulation pump by the controller.

The ejector is disposed at the junction of the fuel gas supply flow path and the circulation flow path, for example. It supplies mixed gas containing the fuel gas and the circulation gas to the fuel electrode of the fuel cell. As the ejector, a conventionally-known ejector may be used.

The circulation flow path may be provided with a gas-liquid separator for reducing the moisture in the fuel off-gas. Also, the circulation flow path may be provided with a water discharge flow path that branches from the circulation flow path by the gas-liquid separator. The water discharge flow path may be provided with a water discharge valve.

The moisture separated from the fuel off-gas in the gas-liquid separator may be discharged by opening the water discharge valve of the water discharge flow path branching from the circulation flow path.

The water discharge valve may be electrically connected to the controller, and the amount of discharged liquid water may be controlled by controlling the opening and closing of the water discharge valve by the controller.

The fuel cell system may include a fuel off-gas discharger.

The fuel off-gas discharger enables the discharge of the fuel off-gas to the outside (the outside of the system). The outside may be the outside of the fuel cell system, or it may be the outside of the vehicle.

The fuel off-gas discharger may include a fuel off-gas discharge valve. As needed, it may further include a fuel off-gas discharge flow path.

The fuel off-gas discharge valve may be electrically connected to the controller, and the fuel off-gas discharge flow amount may be controlled by controlling the opening and closing of the fuel off-gas discharge valve by the controller.

The fuel off-gas discharge flow path may branch from the circulation flow path, for example. It enables the discharge of the fuel off-gas to the outside when the concentration of hydrogen in the fuel off-gas is too low.

The fuel cell system may include the oxidant gas supplier, an oxidant gas supply flow path, and an oxidant gas discharge flow path.

The oxidant gas supplier supplies oxidant gas to at least the oxidant electrode of the fuel cell.

As the oxidant gas supplier, for example, an air compressor may be used. The air compressor is driven by a control signal from the controller and introduces the oxidant gas to the cathode side (such as the oxidant electrode and the cathode inlet manifold) of the fuel cell.

The oxidant gas supply flow path connects the oxidant gas supplier to the fuel cell and enables the supply of oxidant gas from the oxidant gas supplier to the oxidant electrode of the fuel cell.

The oxidant gas is oxygen-containing gas. It may be air, dry air, pure oxygen or the like.

The oxidant gas discharge flow path enables the discharge of the oxidant gas from the oxidant electrode of the fuel cell.

The oxidant gas discharge flow path may be provided with an oxidant gas pressure control valve.

The oxidant gas pressure control valve is electrically connected to the controller. By opening the oxidant gas pressure control valve by the controller, reacted cathode off-gas is discharged from the oxidant gas discharge flow path. By controlling the opening degree of the oxidant gas pressure control valve, the pressure of the oxidant gas supplied to the oxidant electrode (cathode pressure) can be controlled.

The oxidant gas supply flow path may be provided with an intercooler. The intercooler is connected to a refrigerant circulation flow path to exchange heat with the refrigerant and cool down the oxidant gas discharged from the oxidant gas supplier. When it is required to warm up the fuel cell (a power generation pretreatment), the oxidant gas is compressed by the oxidant gas supplier to increase the temperature thereof, and the temperature of the refrigerant is increased by the heat of the oxidant gas.

The fuel cell system may include a bypass flow path which branches from the oxidant gas supply flow path at the downstream side of the intercooler, bypasses the fuel cell, and then is connected to the oxidant gas discharge flow path. The bypass flow path is provided with a bypass valve for controlling the opening state of the bypass flow path. The bypass valve is electrically connected to the controller, and it is opened by the controller when the power of the secondary cell is consumed by driving the oxidant gas supplier in the state where, for example, the charge capacity of the secondary cell is not sufficient at the time of regenerative power generation by the drive motor. Accordingly, the oxidant gas is discharged into the oxidant gas discharge flow path and is not delivered to the fuel cell.

The fuel gas supply flow path and the oxidant gas supply flow path may be connected via a joining flow path. The joining flow path may be provided with a purge valve.

The purge valve may be electrically connected to the controller, and by opening the purge valve by the controller, the oxidant gas in the oxidant gas supplier may be allowed to flow into the fuel gas supply flow path as purge gas.

The purge gas is used for purging, and it may be reaction gas. The reaction gas may be fuel gas, oxidant gas or mixed reaction gas containing them.

The fuel cell system may include a refrigerant supplier and a refrigerant circulation flow path as the cooling system of the fuel cell.

The refrigerant circulation flow path communicates between the refrigerant supply hole and refrigerant discharge hole installed in the fuel cell, circulates the refrigerant supplied from the refrigerant supplier in and out of the fuel cell, and enables the cooling of the fuel cell.

As the refrigerant supplier, examples include, but are not limited to, a cooling water pump.

The refrigerant circulation flow path may be provided with a radiator for heat dissipation from cooling water.

As the cooling water (refrigerant), for example, a mixed solution of ethylene glycol and water may be used to prevent freezing at low temperature.

The system temperature acquirer acquires the temperature of the inside of the fuel cell system.

The temperature of the inside of the fuel cell system may be the temperature of the cooling water used to cool down the fuel cell, may be the outside temperature, or may be the average of these temperatures. Also, the temperature of the inside of the fuel cell system may be determined by comprehensive judgement of the temperatures, etc., of the components inside the fuel cell system.

The system temperature acquirer may be connected to the controller. The controller may be configured to detect the temperature of the inside of the fuel cell system by the output of the system temperature acquirer.

The system temperature acquirer may be a conventionally-known temperature sensor, etc.

The fuel cell system may include the secondary cell.

The secondary cell (battery) needs to be a chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier such as the air compressor, etc. The secondary cell may be chargeable by a power source outside the vehicle, such as a household power source. The secondary cell may be charged by the output power of the fuel cell.

The fuel cell system may include an auxiliary instrument that uses the battery as a power source.

As the auxiliary instrument, examples include, but are not limited to, a lighting instrument for vehicles and an air-conditioning instrument for vehicles.

Also, a charge state sensor for detecting the remaining capacity of the secondary cell, may be installed in the fuel cell system of the disclosed embodiments. The charge state sensor detects the state-of-charge (SOC) value of the secondary cell. The charge state sensor may be connected to the controller. The controller may be configured to detect the state-of-charge value of the secondary cell by the output of the charge state sensor.

The controller may manage the state-of-charge value of the secondary cell and may control the charge and discharge of the secondary cell.

The state of charge (SOC) value means the percentage of the charge capacity with respect to the full charge capacity of the secondary cell. The full charge capacity is a SOC of 100%.

The fuel cell system may include the secondary cell temperature acquirer.

The secondary cell temperature acquirer acquires the temperature of the secondary cell.

The secondary cell temperature acquirer may be connected to the controller. The controller may be configured to detect the temperature of the secondary cell by the output of the secondary cell temperature acquirer.

The secondary cell temperature acquirer may be a conventionally-known temperature sensor, etc.

The controller controls the fuel cell system.

The controller may be connected to the gas-liquid separator, the water discharge valve, the fuel off-gas discharge valve, the oxidant gas pressure control valve, the purge valve, the fuel gas supplier, the oxidant gas supplier, the bypass valve, the secondary cell, the circulation pump, the system temperature acquirer, the secondary cell temperature acquirer and so on through an input-output interface. Also, the controller may be electrically connected to the ignition switch that may be installed in the vehicle.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

FIG. 1 is the flow chart of an example of the method for controlling the fuel cell system of the disclosed embodiments. The disclosed embodiments are not limited to this typical example.

When the system temperature is the predetermined first temperature or less after IG-OFF, the controller charges the secondary cell until the state-of-charge (SOC) value of the secondary cell reaches the predetermined first threshold value, and the controller carries out the first pattern purge (the long purge) on the fuel cell (the low temperature-freezing point mode). When the state-of-charge (SOC) value of the secondary cell is the predetermined first threshold value or more after IG-OFF, the controller does not need to charge the secondary cell.

When the system temperature exceeds the predetermined first temperature after IG-OFF, the controller charges the secondary cell until the state-of-charge value of the secondary cell reaches the predetermined second threshold value that is larger than the predetermined first threshold value, and the controller carries out the second pattern purge having the shorter purge time than the first pattern purge (the short purge) on the fuel cell (the normal temperature mode). After the second pattern purge, the controller carries out a parking purge. When the state-of-charge (SOC) value of the secondary cell is the predetermined second threshold value or more after IG-OFF, the controller does not need to charge the secondary cell.

The system temperature may be the temperature of the cooling water of the fuel cell, may be the outside temperature, or may be the average of these temperatures, for example.

The predetermined first temperature of the system temperature may be normal temperature, may be a temperature higher than normal temperature (high temperature), may be a temperature lower than normal temperature (low temperature), may be a freezing point, or may be determined depending on circumstances, for example.

The first pattern purge (the long purge) is a purge of the fuel cell for about several minutes in the low temperature-freezing point mode. In general, a parking purge is not necessary after the long purge. The first pattern purge (the long purge) may be carried out after charging the secondary cell until the state-of-charge (SOC) value of the secondary cell reaches the predetermined first threshold value or more, or it may be carried out with charging the secondary cell.

The second pattern purge (the short purge) needs to have a shorter purge time than the first pattern purge. For example, the second pattern purge may be a purge of the fuel cell for about ten to a few tens of seconds (e.g., 10 to 20 seconds) in the normal temperature mode, or the second pattern purge does not need to be carried out. In general, a parking purge may be carried out after the short purge. The second pattern purge (the short purge) may be carried out after charging the secondary cell until the state-of-charge (SOC) value of the secondary cell reaches the predetermined second threshold value or more, or it may be carried out with charging the secondary cell.

The first pattern purge is a purge based on the assumption that a parking purge does not need to be carried out thereafter. Accordingly, the predetermined first threshold value of the state-of-charge value of the secondary cell is not particularly limited, as long as it is set to a value which is smaller than the second threshold value and which is equal to or more than the lower limit that satisfies the SOC value necessary for the first pattern purge. In particular, the predetermined first threshold value may be 20% or more and 35% or less, or it may be 25% or more and 30% or less.

The predetermined second threshold value of the state-of-charge value of the secondary cell is not particularly limited, as long as it is larger than the first threshold value. The second pattern purge is a purge based on the assumption that a parking purge is carried out thereafter. Accordingly, the predetermined second threshold value of the state-of-charge value of the secondary cell may be set to a value which is larger than the first threshold value and which is equal to or more than the lower limit that satisfies the SOC value necessary for the second pattern purge and a parking purge. The upper limit of the predetermined second threshold value is not particularly limited. The predetermined second threshold value needs to be determined considering the charging time. In particular, the predetermined second threshold value may be more than 35% and 50% or less, or it may be 40% or more and 45% or less.

According to the disclosed embodiments, when the charging of the secondary cell after IG-OFF is started, the target SOC value of the secondary cell after IG-OFF is switched depending on the temperature of the fuel cell system.

A parking purge is not carried out in the first pattern purge in the low temperature-freezing point mode, which is carried out when the system temperature is the predetermined first temperature or less. Accordingly, the target SOC value can be decreased, and the secondary cell charging time during the stoppage of the power generation of the fuel cell, can be reduced.

When the system temperature exceeds the predetermined first temperature in the normal temperature mode, a limit on continuous charging of the secondary cell, which is necessary at low temperature, is not necessary. Accordingly, even if the target SOC value is increased to the predetermined second threshold value that is larger than the first threshold value, the secondary cell can be charged in a relatively short time. In addition, since a parking purge is carried out in the second pattern purge while the system temperature is high, the discharge energy required of the secondary cell decreases, and the target SOC value is decreased.

Figure 2:
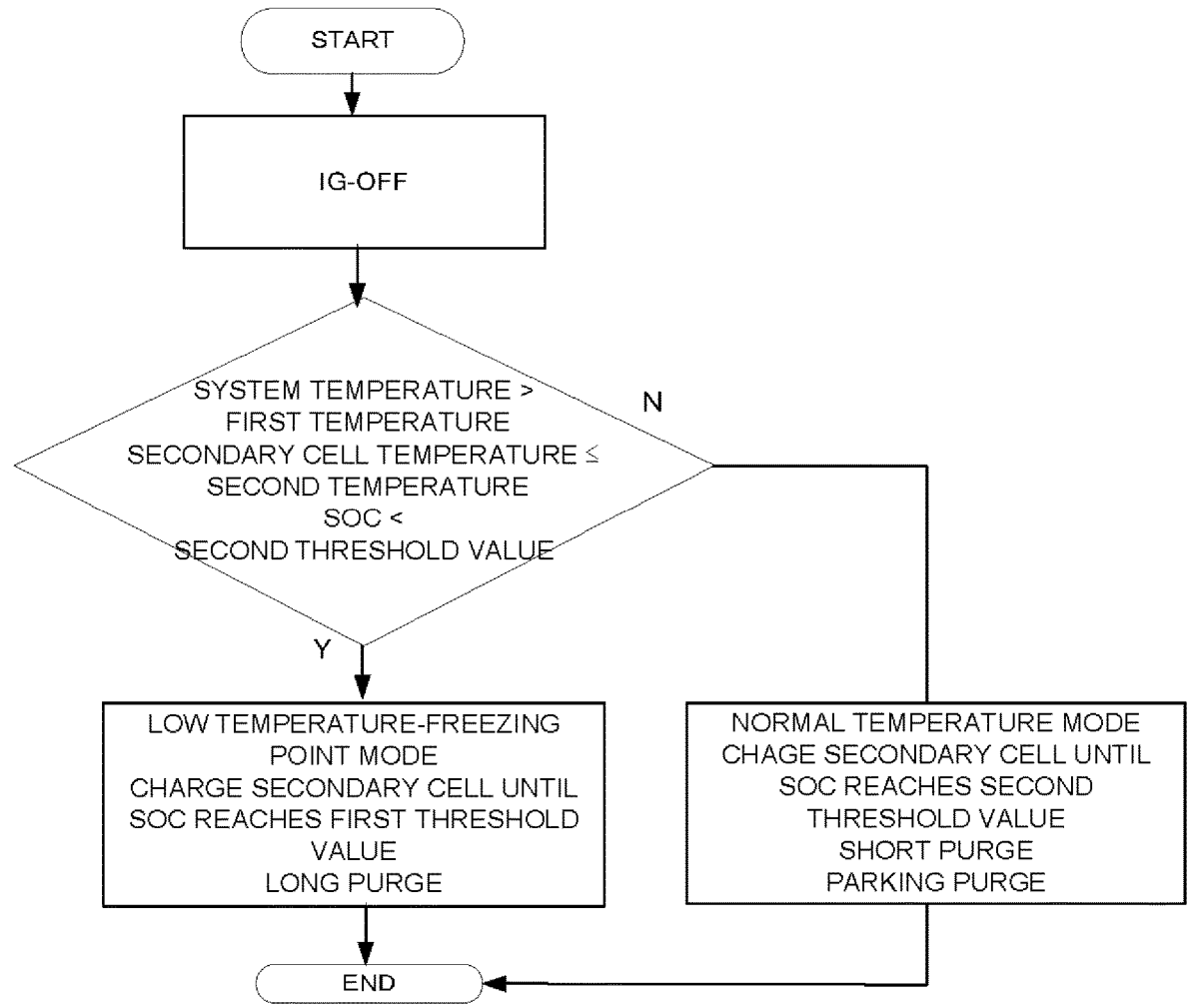
FIG. 2 is the flow chart of another example of the method for controlling the fuel cell system of the disclosed embodiments.

FIG. 2 is the flow chart of another example of the method for controlling the fuel cell system of the disclosed embodiments.

The fuel cell system of the disclosed embodiments further comprises the secondary cell temperature acquirer for acquiring the temperature of the secondary cell. In the disclosed embodiments, when the system temperature exceeds the first temperature, when the secondary cell temperature is the predetermined second temperature or less, and also when the state-of-charge (SOC) value of the secondary cell is less than the second threshold value, the controller carries out the first pattern purge on the fuel cell (the low temperature-freezing point mode). When the state-of-charge (SOC) value of the secondary cell is less than the predetermined second and first threshold values after IG-OFF, in addition to carrying out the first pattern purge, the controller may charge the secondary cell until the state-of-charge (SOC) value of the secondary cell reaches the predetermined first threshold value.

On the other hand, when the system temperature exceeds the first temperature and when the secondary cell temperature exceeds the predetermined second temperature, the controller may carry out the second pattern purge on the fuel cell, regardless of whether or not the state-of-charge (SOC) value of the secondary cell is less than the second threshold value (the normal temperature mode). In this case, when the state-of-charge (SOC) value of the secondary cell is less than the second threshold value, the controller may charge the secondary cell until the state-of-charge (SOC) value of the secondary cell reaches the second threshold value or more. When the state-of-charge (SOC) value of the secondary cell is the second threshold value or more, the controller does not need to charge the secondary cell.

The predetermined second temperature of the secondary cell may be appropriately determined based on, for example, depending on the properties of the secondary cell, the temperature at which a charge limit on continuous charging is needed.

Even when the system temperature exceeds the first temperature, if both the temperature and SOC value of the secondary cell are low, the charging of the secondary cell is judged to take a long time, and the first pattern purge that the target SOC value may be small, is carried out, whereby the secondary cell charging time during the stoppage of the power generation of the fuel cell, is reduced.

The invention claimed is:

1. A fuel cell system installed in a vehicle, the system comprising:
   a fuel cell,
   a secondary cell,
   a system temperature acquirer for acquiring a temperature of an inside of the fuel cell system, and
   a controller,
   wherein, when the system temperature is a predetermined first temperature or less, the controller charges the secondary cell until a state-of-charge value of the secondary cell reaches a predetermined first threshold value, and the controller carries out a first pattern purge on the fuel cell, and
   wherein, when the system temperature exceeds the predetermined first temperature, the controller charges the secondary cell until the state-of-charge value of the secondary cell reaches a predetermined second threshold value that is larger than the predetermined first threshold value, and the controller carries out a second pattern purge having a shorter purge time than the first pattern purge on the fuel cell.

2. The fuel cell system according to claim 1, the system further comprising a secondary cell temperature acquirer for acquiring a temperature of the secondary cell,
   wherein, when the system temperature exceeds the first temperature, when the secondary cell temperature is a predetermined second temperature or less, and also when the state-of-charge value of the secondary cell is less than the second threshold value, the controller carries out the first pattern purge on the fuel cell.

* * * * *